Jan. 20, 1959  G. M. SPENCE  2,869,984
PROCESS FOR THE PRODUCTION OF SODIUM ALUMINATE SOLUTION
Filed June 13, 1955
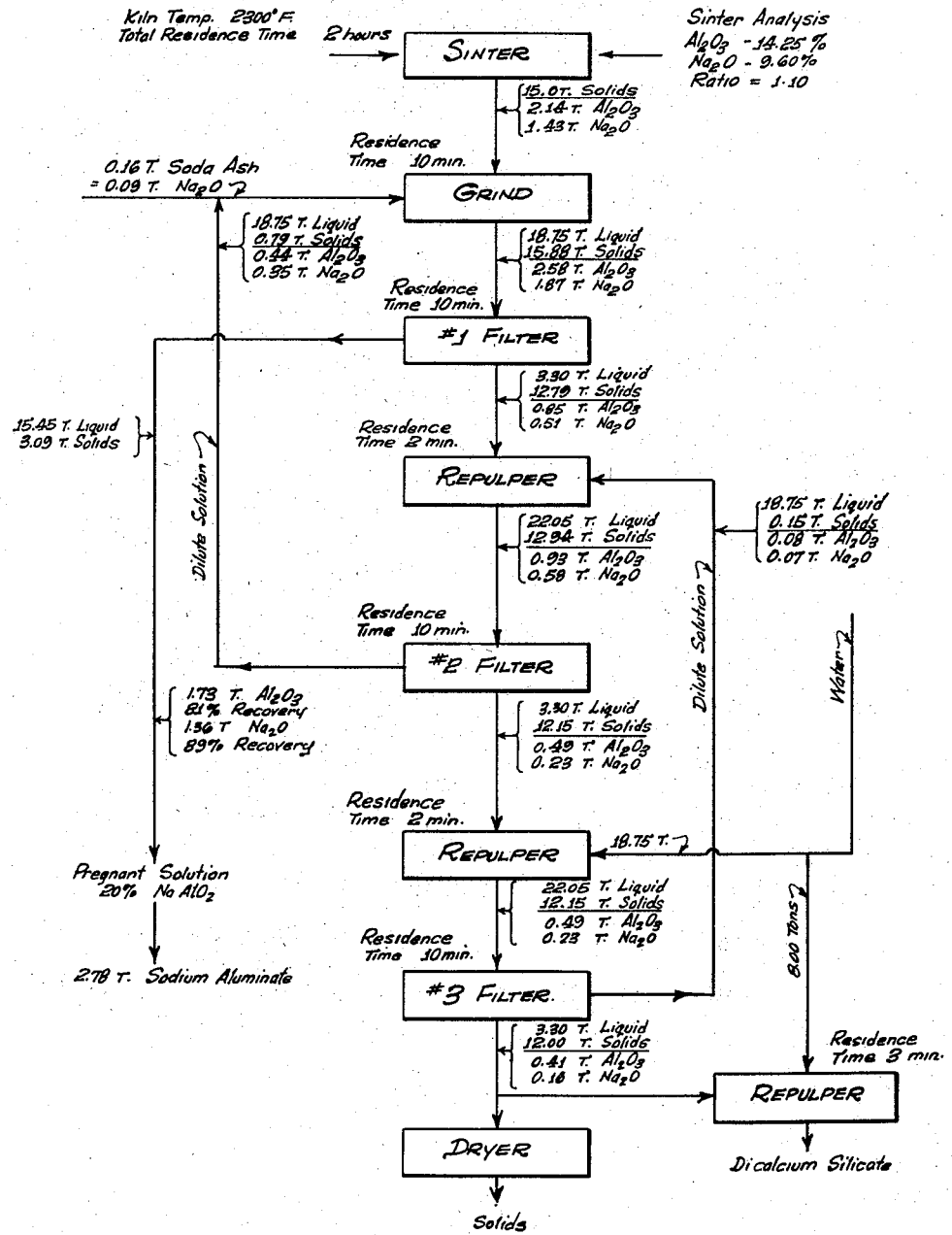
INVENTOR.
GERALD M. SPENCE,
By  Edwd D. O'Brian
ATTORNEY.

United States Patent Office 2,869,984
Patented Jan. 20, 1959

2,869,984

PROCESS FOR THE PRODUCTION OF SODIUM ALUMINATE SOLUTION

Gerald M. Spence, Laramie, Wyo.

Application June 13, 1955, Serial No. 515,103

1 Claim. (Cl. 23—52)

The present invention relates to a new and improved process for the production of sodium aluminate solution.

At the present time in the manufacture of aluminum oxide, sodium aluminate solutions are produced from a number of different minerals by the broad process of sintering aluminum silicate minerals such as, for example, kaolin or anorthosite together with fluorspar, marl, or limestone and soda, or soda bearing material in such proper proportions so as to produce a sinter containing primarily insoluble dicalcium silicate and soluble sodium aluminate, grinding the sinter so produced in the presence of an alkaline soda solution, and leaching the mixture in the grinding operation. A process of this broad category is shown and described in the Anderson et al. Patent No. 2,421,918. The precise step of leaching the ground residue from the sinter mill shown in this patent is comparatively difficult to carry out, and the recovery of alumina from this residue is not as high as can be desired.

It is a broad object of the present invention to provide a new process for the production of sodium aluminate solution from sintered material prepared as broadly indicated in the preceding discussion. A further object of the invention is to provide a process of the class described which is relatively efficient, inexpensive to carry out, and effective for the purpose intended.

The present invention may be briefly summarized as involving the steps of grinding sintered material containing dicalcium silicate, sodium aluminate and other solids in the presence of soda ash and water serving as a vehicle to aid in the grinding so as to form what may be termed a "pregnant" solution of sodium aluminate, then rapidly separating this pregnant solution from the insoluble materials present by means of filtration. Further steps of the invention involve repeated washing of solids in the filtration step indicated by admixing these solids with water and then separating them from the liquid present after each washing by means of filtration. The precise nature of the present invention is, of course, more fully summarized by the appended claim forming a part of this specification. The precise nature of the invention is best described with reference to the remainder of this specification and the accompanying flow sheet.

A large number of different minerals may be employed as the precise starting materials for use with the instant invention. This invention is, however, especially designed to be employed with starting materials such as are designated in the aforesaid Anderson et al. patent. With such starting materials, it is preferable to grind together the various minerals as obtained by mining operations, and then burn these minerals so as to produce a sinter composed principally of sodium aluminate and dicalcium silicate, which sinter may be used for Portland cement manufacture after subsequent extraction and removal of the majority of the sodium aluminate.

Sintered material of this category is, with the instant invention, intermixed with soda ash, water, and/or recycled process solution and ground in the presence of these ingredients in conventional grinding equipment, such as a ball mill or the like, so as to accomplish a major size reduction in the sintered particles and so as to cause complete intermixture of the various ingredients. The precise quantity of soda ash and water used in this step may be varied within limits. It is preferred that enough water be used in this step so that the actual grinding operation is promoted to the maximum possible extent and so that substantially all of the alumina present is placed in solution. The amount of soda ash which is added during such grinding should be sufficient so that a stable sodium aluminate solution can be subsequently produced. The mol ratio of these ingredients within the grinding apparatus should thus not be less than $$\frac{Na_2O}{Al_2O_3}=1.1$$

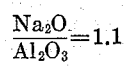

and it can be as high as 1.9. If excess soda is not present within the solution which is formed, alumina tends to precipitate out of this solution and to be carried over from the process with various insoluble residues which are normally manufactured into Portland cement. Obviously, such loss of alumina should be held to a minimum. A small quantity—preferably within the range of from about 0.2 to about 2.0% by weight of the sintered material—of a suitable sugar such as molasses or common corn syrup can be added at the grinding mill so as to tend to prevent the hydrolysis of any dicalcium silicate present within the sintered material and to stabilize the sodium aluminate solution. The quantity of liquid added during this step may be varied within wide limits. This liquid may be water as obtained from a common supply source, but preferably is a dilute process solution obtained for a subsequent filtering operation. Sufficient liquid should be used so that the sodium aluminate present goes into solution easily; thus the quantity of water present is preferably in excess of that required to form a saturated solution of this compound. If too large a quantity of water is present, the excess presents a removal problem in the subsequent recovery of sodium aluminate or alumina from the pregnant solution created.

Normally, sodium aluminate solution tends to be extremely unstable in character, and alumina tends to separate out of it so as to be carried over with any insoluble residues. This instability of sodium aluminate is related to the hydrolysis of dicalcium silicate present. It is generally desired to remove all sodium aluminate possible without a noticeable amount of hydrolysis of the dicalcium silicate transpiring. Hydrolysis of the dicalcium silicate within such a solution at this step is disadvantageous for the reason that it tends to thicken the slurry obtained in such a manner that it may not be readily handled, and for this reason further separation from it of pregnant solution is difficult.

Following the grinding step indicated above in carrying out the instant invention, the resultant product is passed rapidly to a filter where the solid residues are separated from sodium aluminate solution, and, if desired, washed with water in the filter, and the liquid from this filter is forwarded for alumina or sodium aluminate recovery. After this filtering step, the solid residues, in accordance with the instant invention, are preferably repulped in a mixing conveyor, or like apparatus, together with a substantial quantity of water or recycled dilute process solution from a subsequent filtering operation for a short period sufficient to place the maximum amount of remaining sodium aluminate in solution, and then the liquid present during such repulping operation is recovered by a further filtering step and sent for the recovery of alumina together with the initial filtrate, preferably by being recycled to the grinding operation as indicated on the accompanying flow sheet. The solid residues resulting from this last step may, if desired, be further repulped and filtered one or two further times. It is usually advantageous to wash the solids separated upon each filter employed. The exact course of the various dilute filtrates other than the initial filtrate depends upon the number of times the residue produced at the initial separation of the insolubles and pregnant solution are subsequently repulped, filtered and washed. The various solid residues treated in this manner can, following the final filtering operation be directly sent to a cement mill for use in the manufacture of Portland cement, or dried and used as admixture for making masonry or puzzolan cement, or used as a soil conditioner similar to agricultural limestone.

Normally all of the steps of the process described in this specification are carried out as rapidly as possible, using continuous processing equipment such as rotary filters and the like. As the process of the invention is being carried out commercially approximately 20 to 30 minutes are required for solids entering the grinding mill employed to be discharged from the final filter. This speed in which the invention is carried out is important commercially, and is achieved with efficient removal of sodium aluminate. This result is believed to be completely unexpected. If desired, the filtrates obtained from various filtering operations other than the initial filtering operation can be recycled with this invention so as to conserve water, and so as to enable any sodium aluminate or soda present within these filtrates to be recovered along with the sodium aluminate solution produced.

In the accompanying flow sheet a preferred mode of carrying out the present invention is illustrated. As indicated in this flow sheet in carrying out this invention 15.0 tons of a sinter prepared at 2300° F. in a kiln and containing soluble sodium aluminate and dicalcium silicate is employed. When analyzed this sinter contains 2.14 tons or 14.25% $Al_2O_3$ and 1.43 tons or 9.60% $Na_2O$ corresponding to a mol ratio of soda to alumina of 1.10. This sinter is initially ground for a period of ten minutes in the presence of 18.75 tons of water recycled from a second filter used in this process. This liquid contains 0.44 ton $Al_2O_3$ and 0.35 ton $Na_2O$ or a total of 0.79 ton of solids. To it there is added 0.16 ton of soda ash; this amount of soda ash corresponds to 0.09 ton of $Na_2O$. After this mixture is ground for a period of ten minutes, a slurry is obtained containing 18.75 tons of water and 15.88 tons of solids. In this slurry there are 2.58 tons $Al_2O_3$ and 1.87 tons $Na_2O$.

A period of ten minutes is consumed in rapidly filtering this slurry so as to obtain a pregnant sodium aluminate solution containing 2.78 tons of sodium aluminate, 15.45 tons of water and a total of 3.09 tons of solids. Of these solids 1.73 tons are $Al_2O_3$ corresponding to an 81% recovery of $Al_2O_3$ and 1.35 tons are $Na_2O$ corresponding to 89% recovery of this oxide.

The filter cake from the #1 filter contains 3.30 tons of water and 12.79 tons of solids. Of these solids 0.85 ton are $Al_2O_3$ and 0.51 ton are $Na_2O$. This filter cake is repulped for a period of two minutes with a recycled process solution from the #3 filter used in the process. This dilute recycled process solution contains 18.75 tons of water and 0.15 ton of solids of which 0.08 ton are $Al_2O_3$ and 0.07 ton are $Na_2O$. This results in a slurry containing 22.05 tons liquid and 12.94 tons solids. Included in these solids are 0.93 ton $Al_2O_3$ and 0.58 ton $Na_2O$.

The repulped slurry is then filtered on the #2 filter used in the process so as to produce the filtrate indicated in the preceding used in grinding the sinter. A period of ten minutes is consumed during this filtration, and the filter cake resulting from it contains 3.30 tons liquid or water and 12.15 tons of solids of which 0.49 ton are $Al_2O_3$ and 0.23 ton are $Na_2O$. This filter cake is repulped for a period of two minutes together with 18.75 tons make up water so as to produce a slurry containing 22.05 tons of liquid or water and 12.15 tons of solids of which 0.49 ton are $Al_2O_3$ and 0.23 ton are $Na_2O$. The slurry from this second repulping operation is then filtered so as to produce the filtrate recycled to the first repulper. This filtrate has a composition as indicated in the preceding discussion.

The filter cake from the #3 filter contains 3.30 tons of water and 12.00 tons of solids of which 0.41 ton are $Al_2O_3$ and 0.16 ton of $Na_2O$. This filter cake may then be dried in a drier so as to produce a solid residue or may be repulped with 8.00 tons of water for a period of three minutes in order to produce a slurry containing dicalcium silicate.

If desired, it is possible with the instant invention to dispense with all except one of the filtering operations specifically indicated. When this is done, a corresponding reduction in the quantity of alumina recovered is, of course, obtained.

Use of settlers and agitators of a conventional category, such as, for example, Dorr thickeners, with the invention is not as a rule considered desirable. With such thickeners, the recovery of alumina from sintered material is less than with the instant invention by what commercially is to be considered a material percentage. Because of the character of the equipment involved, less time is required in carrying out the instant invention than with the prior equipment, and, further, because of the shortened period of contact of sodium aluminate solution with insoluble material subsequently to be used in Portland cement manufacture, there is less tendency for the alumina to precipitate out of such solution.

Those skilled in the art will realize that the present invention marks a substantial improvement over related processes known to the art as indicated briefly above. Obviously, a number of minor details of the present invention may be varied without departing from the essential teachings of it, and all such variations, in so far as they are within the skill of the art, are to be considered as part of the inventive concept.

I claim as my invention:

A process of producing a sodium aluminate solution from a sinter material containing sodium aluminate and dicalcium silicate, which process comprises: grinding the sintered material with soda ash and water so as to form an aqueous sodium aluminate solution and solids containing dicalcium silicate, immediately thereafter and before any noticeable hydrolysis of dicalcium silicate occurs rapidly separating said solution from the insoluble material present by filtration, washing the solids separated from said solution by admixing said solids with water and separating said solids from said water by filtration, and recycling said water to said grinding step.

References Cited in the file of this patent
UNITED STATES PATENTS

| | | |
|---|---|---|
| 1,157,436 | Spence et al. | Oct. 19, 1915 |
| 1,591,365 | Cowles | July 6, 1926 |
| 1,971,354 | Scheidt et al. | Aug. 28, 1934 |
| 2,141,132 | Folger | Dec. 20, 1938 |
| 2,421,918 | Anderson et al. | June 10, 1947 |
| 2,442,137 | Lynn et al. | May 25, 1948 |